July 8, 1969  J. W. SMITH  3,454,033
TIRE VALVE WITH PRESSURE CORRECTION MEANS
Filed Nov. 22, 1965  Sheet 1 of 2
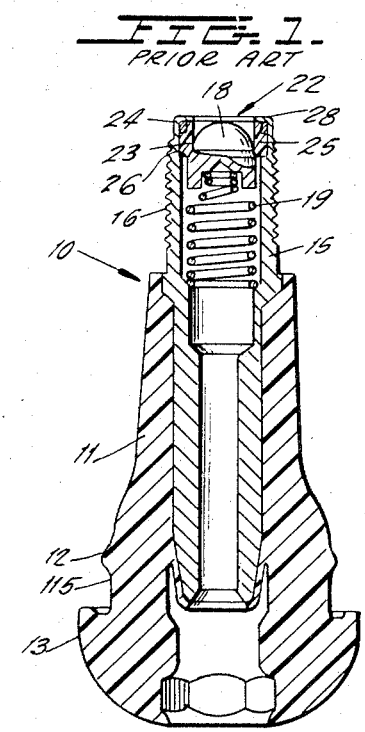
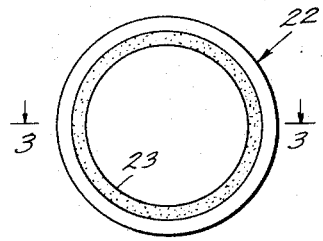
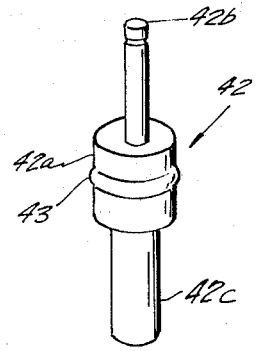
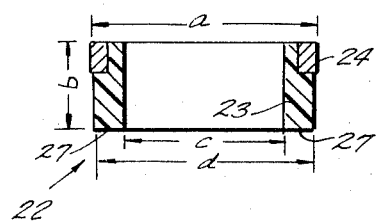
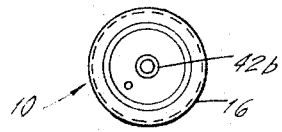
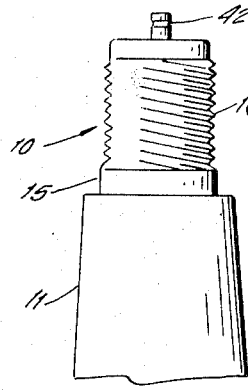
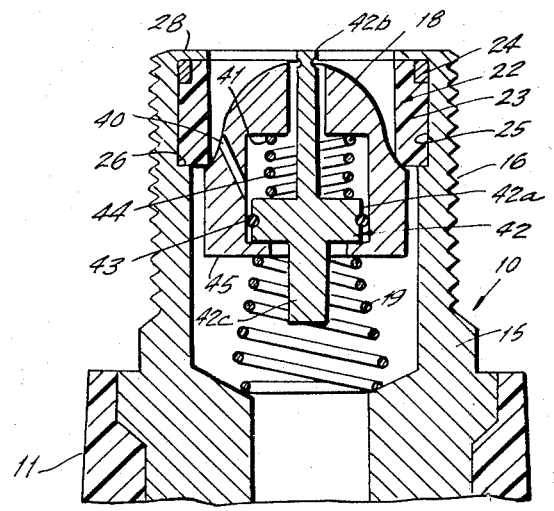
JOHN W. SMITH
INVENTOR
BY Allen R. Meyer
ATTORNEY

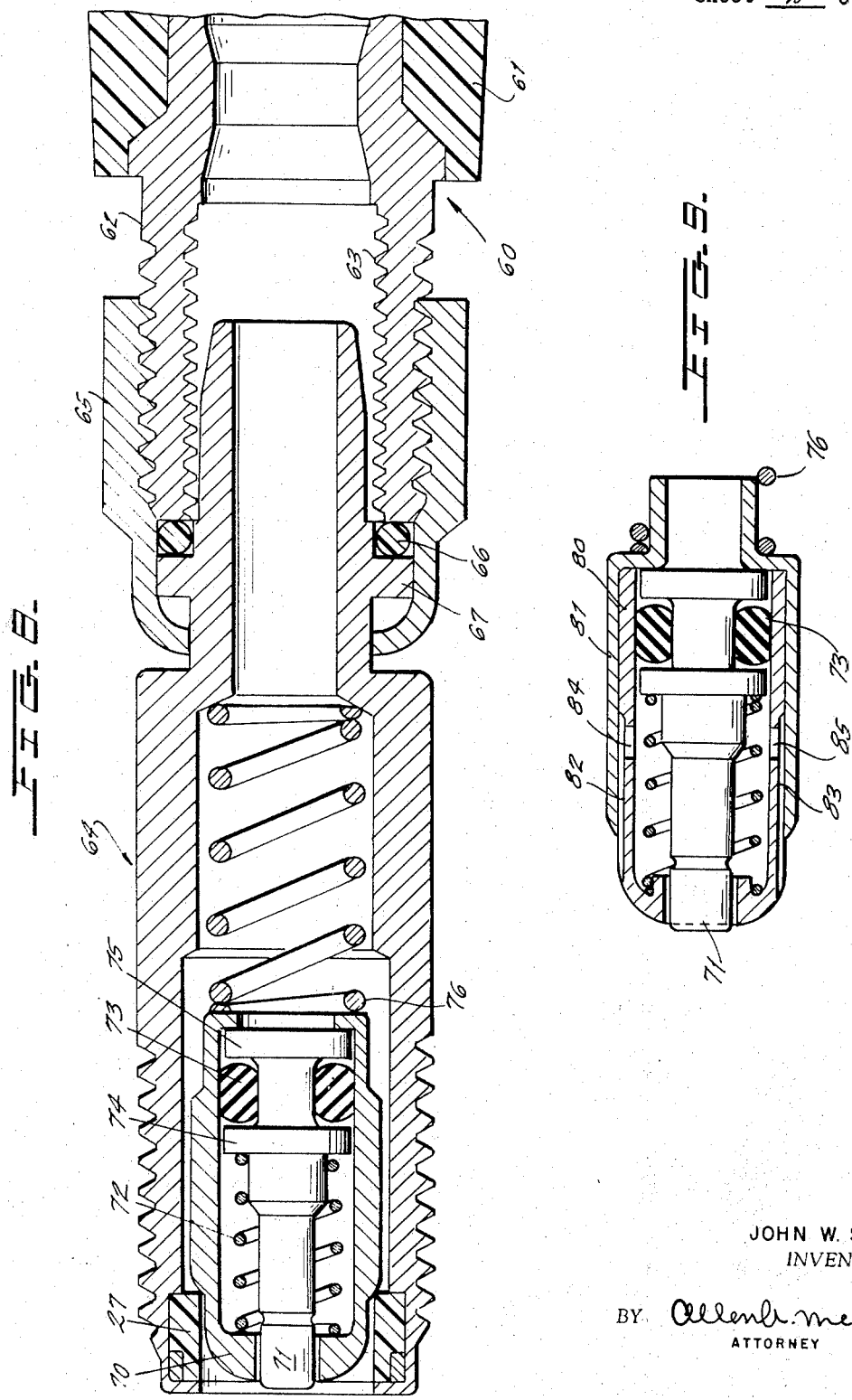

3,454,033
TIRE VALVE WITH PRESSURE
CORRECTION MEANS
Joseph W. Smith, Trumbull, Conn., assignor to National
Distillers and Chemical Corporation, New York, N.Y.,
a corporation of Virginia
Filed Nov. 22, 1965, Ser. No. 509,008
Int. Cl. F16k 15/18, 15/20
U.S. Cl. 137—226                                    4 Claims

ABSTRACT OF THE DISCLOSURE

A valve for an automotive tire which includes a pressure-relief valve which opens when the tire pressure exceeds a predetermined value. The pressure-relief structure is contained within the movable valve plug of a standard tire valve and consists of an auxiliary valve having a stem which is moved to a visible position responsive to tire over-pressure. Automatic bleeding of high tire pressure is obtained when the movable stem moves to the visible position. The pressure relief structure is biased closed by a stainless steel spring in order to obtain a predetermined schedule of pressure relief versus temperature.

---

This invention relates to a valve, and more particularly to a valve for use with automotive tires wherein the valve maintains predetermined pressure conditions in an automatic manner and provides visual means for determining predetermined pressure conditions within the tire.

Valves for automotive tires are well known to the art and are shown, for example, for the case of a tubeless tire valve in U.S. Patent 3,180,349 entitled "Tubeless Tire Valve" in the name of Donald E. Steer and Joseph W. Smith. Valves of this type, as well as the typical valves used in automobile tubes wherein a valve core is commonly inserted for the control of air pressure, are generally simple valve structures which permit the passage of air into the tire and prevent the exit of air therefrom, regardless of the pressure within the tire. Thus, the air pressure within the tire is dependent solely upon the operator filling the tire.

Because of this, many inflation malpractices are performed which often lead to tire failure and dangerous accidents. Some of these inflation malpractices are due to inaccurate gauges, erroneous inflation pressure service charts, individual mechanic inflation prejudices, increase of pressure due to increase in temperature, and alternatively the inflation of tires to a particular pressure in one temperature environment with a tire subsequently operating in a different temperature environment.

The principle of the present invention provides a novel pressure control within a standard type of tire valve which could be used with normal inflating and gauging equipment where, however, means are provided for the accurate control of the tire pressure, and for the change of pressure with temperature according to a predetermined schedule.

The individual tire valve assembly may then be suitably color-coded for the predetermined pressure-temperature schedule which the tire should follow. Moreover, means are provided for indicating pressure ranges within the tire by a visually observable extending member protruding from the tire.

In particular, and in accordance with the invention, the typical valve plug or movable valve member of a standard tire valve is provided with a channel extending between the high and low pressure regions thereof which, if open, would bleed pressure from the interior of the tire. A movable stem is then contained within the plug which moves against the biasing spring and responsive to the internal tire pressure to open or close this bleeding channel. Thus, when the pressure within the tire is below that which the tire should contain, the movable stem will maintain the bleeding channel closed so that pressure can continue to be built up within the tire. When, however, the pressure within the tire exceeds the nominal tire pressure, the movable valve will open the bleeding channel to permit pressure relief. This same movable stem may then have an extending section which is movable to a visually observable position at the exterior of the valve so that the operator can tell at a glance approximately what pressure is in the tire as by observing various color bands on the visually observable portion of the stem.

Finally, the biasing spring for controlling the movement of the movable stem against the internal tire pressure is so designed that the internal tire pressure will follow a predetermined schedule of increasing pressure as a function of increasing temperature. In some cases, it has been useful to make this spring of a bimetal arrangement in order to more closely approximate the desired pressure-temperature curve.

While the novel modification of the invention can be completely carried within the normal valve plug, it will be apparent that the invention can also be applied to the typical valve core used for tire tubes. Moreover, if desired, the invention can be manufactured as an adapter which can be threaded onto existing tire valves.

Accordingly, a primary object of this invention is to provide a tire valve which provides a visually observable indication when the internal air pressure reaches some predetermined value.

Another object of this invention is to provide a novel tire valve which prevents the admission of additional air into a tire after the tire pressure reaches some designated maximum inflation pressure.

A still further object of this invention is to provide a novel tire valve which automatically compensates for tire internal air temperature over a relatively wide internal air temperature range, thereby to eliminate concern with hot or cold inflation practice.

A still further object of this invention is to provide a novel tire valve which provides automatic pressure control which fits pre-existing wheel valve openings and which can be adapted to be connected to presently existing valves.

Yet another object of this invention is to provide a novel tire valve which will bleed out air within the tire only when a predetermined temperature and pressure condition is obtained.

Yet another object of this invention is to provide a novel improved tire valve which will accommodate presently existing valve caps, extensions and air supply connections.

A further object of this invention is to provide a novel automatic pressure-responsive valve which is relatively inexpensive.

These and other objects of this invention will become apparent from the following description when taken in connection with the drawings, in which:

FIGURE 1 is a cross-section view of a prior art type valve for a tubeless tire.

FIGURE 2 is an axial cross-section of the atmospheric seal used in the valve of FIGURE 1.

FIGURE 3 is a cross-section of the seal shown in FIGURE 2 along the lines 3—3.

FIGURE 4 is a partial cross-sectional view of the valve of FIGURE 1 when the valve plug is modified in accordance with the present invention.

FIGURE 5 is a perspective view of the movable stem of FIGURE 4.

FIGURE 6 is a plan view of the valve of FIGURE 4 with the stem in an extended position.

FIGURE 7 is a top view of FIGURES 4 and 6.

FIGURE 8 shows a modification of the arrangement of FIGURES 1 through 7 wherein the valve constructed in accordance with the invention can be directly connected to a standard valve stem, thereby to modify the pre-existing structure on an automobile tire.

FIGURE 9 shows the manner in which the button of FIGURE 8 may be modified for automatic air pressure bleeding.

Referring now to the figures, FIGURE 1 shows a plug-in tire valve 10 made in accordance with the prior art as described in U.S. Patent 3,180,349 described above.

The housing portion 11 is a rubberized material which has an outer configuration that permits snapping it into a hole in the metal rim of a tubeless tire. All the elements of the valve 10 are essentially circular in cross-section. The metal rim of the tire has a hole and when the valve 10 is snapped into place the annular surface 11s forms a seal with the annular hole surface. The annular protrusions 12 and 13 in the body 11 define the width of the sealing surface 11s and serve to hold the valve 10 in place after the valve has been snapped into the tire rim.

A metal body 15 is coaxial with the rubber housing 11 and, in the main, is inside the housing 11. The metal body 15 has a threaded cap end 16 which protrudes from the housing 11. It is important that the outer dimensions of the cap end 16 be the same as the outer dimensions of the cap end of a standard tire valve. The maintenance of such dimensions in the cap end 16 permits use of standard gauging and inflating equipment with the valve 10. The cap end 16 is threaded to receive a standard valve cap (not shown) as a secondary protective seal.

A standard size button or plug means 18 is held in the outboard position by a spring 19 until inward pressure is exerted on the button 18 by gauging or inflating equipment. It is important that the button 18 be standard size for the same reasons that the outside dimensions of the cap end 16 must be standard size, to permit use of standard gauging and inflating equipment.

There is extremely little space left between the button 18 and the inner walls of the cap end 16 to effect the seal that is necessary so that air will not escape from the tire when the button 18 is in the outboard position, which is its usual position. With a replaceable core, such a seal is not needed at this location.

FIGURES 2 and 3 show the seal 22 more clearly than in FIGURE 1.

The seal 22 itself is composed of a rubber-like ring 23 reinforced by a metallic ring 24. A number of rubber-like materials may be suitable for this purpose. However, a neoprene material having a durometer hardness between 55 and 60 has been found satisfactory and preferable in the illustrated embodiment. The following dimensions are given for the embodiment illustrated, although it will be apparent that other dimensions may be used while staying within the concepts of the invention. The dimensions indicated by the letters $a$, $b$, $c$ and $d$ in FIGure 3 are:

$a$—0.243–0.246 in.
$b$—0.093 in.
$c$—0.180 in.
$d$—0.237 in.

As may best be seen in FIGURE 1, the actual sealing mechanism is the seal 22 set into a recess 25 in the inner wall of the cap end 16. The recess 25 provides a front-wardly fusing wall 26 which abuts the rear surface 27 of the seal 22. A tab 28 which is integral with the metal body 15 is tucked over to contact the metal ring 24. The seal 22 is thus held in place against forward and rearward movement by the combined effect of the recess wall 26 and the tab 28.

The metal ring 24 has two related functions. The first is to supply rigidity to the seal 22 so that the seal 22 will not buckle. The second is to provide a place on the seal 22 where the flap 28 can exert a force to hold the seal 22 in place. If the entire seal 22 were made of rubber, so small a flap 28 would not hold back the seal 22 even if the seal did not buckle but rather would merely dig into the seal 22 as the seal 22 was pushed outwards under the force of the spring 19. Thus it is the use of the metal ring 24 located in the front outer corner of the seal 22 that makes possible a coreless tire valve which has dimensions that permit its use in conjunction with standard gauging and inflating equipment.

The above described seal 22 permits the design of a coreless replaceable valve which may be used with standard gauging and inflating equipment. It permits an adaptation of the cap end of a valve without requiring significant dimensional changes in the cap end.

In accordance with the present invention, the button or plug 18 is modified in the manner best shown in FIGURE 4, wherein a bleeding channel 40 passes through the button 18 and communicates between the high pressure side of plug 18 which is internal of the tubular member 15 and the low pressure side of plug 18 which is external of the interior of tube 15. An internal cavity 41 is then placed in the plug means 18 and receives a movable stem 42 which has an enlarged piston portion 42a, an upper extending portion 42b, and a lower portion 42c.

As best shown in FIGURES 4 and 5, an O-ring 43 extends around piston portion 42a and forms an air seal between the piston portion 42a and the interior walls of cavity 41. A biasing spring 44 is then connected to the movable stem 42 to bias the stem 42 downwardly to a stop position defined by the inwardly turned bottom section 45 of the plug means 18.

When the movable stem 42 is in the position shown in FIGURE 4 it will be noted that it seals the channel 40 from the pressure at the interior of the tubular stem 15. Clearly, however, when the pressure in the interior of stem 15 is sufficiently high to overcome the spring force of biasing spring 44, the movable stem 42 will move upwardly with the sealing ring 43 eventually clearing the lower end of channel 40, thereby permitting the relief of the internal air pressure within the tire to the exterior of the valve. Once this pressure is sufficiently relieved, the biasing spring 44 returns the movable stem from its open position to the sealing position shown in FIGURE 4 in which the bleeding channel 40 is sealed.

It will now be apparent that once the pressure within the tire and in the exterior of tubular stem 15 exceeds some predetermined pressure, there will be automatic pressure relief so that the tire cannot be overly inflated.

Moreover, when the excessive pressure conditions are obtained, the extension 42b of the movable stem 42 will move outwardly, as shown in FIGURE 6, thereby being visible to the operator so that he will know that the tire has been excessively inflated for the existing temperature conditions and for the nominal pressure rating of the tire. He will, therefore, permit the tire to automatically deflate by virtue of bleeding through channel 40 until the movable stem 42 returns to the position of FIGURE 4.

Further in accordance with the present invention, and in order to obtain a satisfactory pressure-temperature characteristic, the spring 44 is preferably designed so its spring characteristic will follow some predetermined temperature-pressure characteristic. That is to say, the nominal tire pressure which is desired is a pressure related to some standard temperature. If the temperature at the time of tire inflation is higher than this nominal temperature, then the tire pressure should be correspondingly higher in accordance with the predetermined schedule. Therefore, if the tire is operated under lower temperature conditions, the tire pressure will be correspondingly reduced, but will, however, not be reduced below satisfactory operating conditions.

In a particular embodiment of the invention, the spring 44 is made of stainless steel, and the following temperature-pressure schedule will be obtained. Note that in this temperature-pressure schedule a reference pressure of 28 lbs. per square inch for the interior of the tire has been selected for an absolute temperature of 530° (70° F.). This will be the nominal rating for the particular tire, and the valve for the tire would be designed accordingly. This particular type of valve rating could be made visually observable by suitably color-coding the valve exterior. The chart or schedule is as follows:

| Temp. | Temp. absolute | Pressure, lbs. per sq. in. | Temp. | Temp. absolute | Pressure, lbs. per sq. in. |
| --- | --- | --- | --- | --- | --- |
| −20 | 440 | 23.25 | 145 | 605 | 31.98 |
| −15 | 445 | 23.52 | 150 | 610 | 32.22 |
| −10 | 450 | 23.76 | 155 | 615 | 32.5 |
| −5 | 455 | 24.05 | 160 | 620 | 32.78 |
| 0 | 460 | 24.3 | 165 | 625 | 33.05 |
| 5 | 465 | 24.57 | 170 | 630 | 33.3 |
| 10 | 470 | 24.77 | 175 | 635 | 33.55 |
| 15 | 475 | 25.1 | 180 | 640 | 33.8 |
| 20 | 480 | 25.38 | 185 | 645 | 34.05 |
| 25 | 485 | 25.65 | 190 | 650 | 34.35 |
| 30 | 490 | 25.9 | 195 | 655 | 34.6 |
| 35 | 495 | 26.16 | 200 | 660 | 34.9 |
| 40 | 500 | 26.44 | 205 | 665 | 35.12 |
| 45 | 505 | 26.7 | 210 | 670 | 35.4 |
| 50 | 510 | 26.97 | 215 | 675 | 35.65 |
| 55 | 515 | 27.2 | 220 | 680 | 35.9 |
| 60 | 520 | 27.49 | 225 | 685 | 36.18 |
| 65 | 525 | 27.75 | 230 | 690 | 36.4 |
| 70 | 530 | 28 | 235 | 695 | 36.72 |
| 75 | 535 | 28.3 | 240 | 700 | 37 |
| 80 | 540 | 28.58 | 245 | 705 | 37.25 |
| 85 | 545 | 28.85 | 250 | 710 | 37.5 |
| 90 | 550 | 29.1 | 255 | 715 | 37.75 |
| 95 | 555 | 29.3 | 260 | 720 | 38.05 |
| 100 | 560 | 29.6 | 265 | 725 | 38.3 |
| 105 | 565 | 29.83 | 270 | 730 | 38.55 |
| 110 | 570 | 30.10 | 275 | 735 | 38.81 |
| 115 | 575 | 30.39 | 280 | 740 | 39.1 |
| 120 | 580 | 30.62 | 285 | 745 | 39.35 |
| 125 | 585 | 30.92 | 290 | 750 | 39.6 |
| 130 | 590 | 31.18 | 295 | 755 | 39.9 |
| 135 | 595 | 31.45 | 300 | 760 | 40.02 |
| 140 | 600 | 31.7 | | | |

Note that this schedule which gives satisfactory performance could be further modified through the provision of bimetallic springs or the like.

In FIGURES 4 through 7, the valve of the present invention has been described particularly with reference to use in a tubeless tire valve, and is of the nature of the original equipment for the valve. It is, however, possible to provide the novel valve of the invention as a subassembly which can be connected to a pre-existing valve structure already secured to an automobile tire.

FIGURE 8 specifically illustrates the manner in which a presently existing valve structure can be modified by an adapter which includes a movable button which serves the indication purpose previously described in FIGURES 4 through 7.

FIGURE 9 illustrates the manner in which this button can be modified for the additional function of excessive air pressure bleeding.

Referring first to FIGURE 8, there is illustrated therein a typical standard tire tube valve 60 which includes the usual body 61 and a threaded cap end 62. The internal thread 63 in cap end 62 normally receives an internal valve core which, for purposes of the present invention, has been removed.

An adapter structure 64 is then connected to the valve 60 by the nut 65 which has an internal thread, as shown, designed to fit onto the external thread of valve end 62 which normally receives the valve cap. An air-tight seal is formed between an adapter 64 and valve 60 by a suitable O-ring 66 which is captured between the end of valve 62 and extending flange 67 of adapter 64. Note that the upper end of nut 65 is rolled over flange 67, as shown, so that it is slidably carried upon adapter 64.

The adapter 64 then carries a button 70 which may be identical to the button of FIGURES 4 through 7. The button 70 then receives an internal movable stem 71 which may be identical to the stem 42 of FIGURES 1 through 7, and contains an internal biasing spring 72 for biasing the stem 71 to the right with respect to button 70.

Note that in FIGURE 8 the sealing gasket 73, which performs the function of gasket 43 in FIGURE 4, is captured between the two flanges 74 and 75 on the stem 71.

A main biasing spring 76 then biases the assembly of button 70 and stem 71 to the left and into sealing engagement with the seal 77 which may be identical to the seal 22 of FIGURE 4.

In the arrangement of FIGURE 8, the spring 72 is preferably a stainless steel spring, whereupon over-inflation of the tire to which valve 60 is connected will cause the ejection of pin 71 and thus an indication of this over-inflation. The proper pressure will then be obtained by depressing button 70 until stem 71 is moved to its normal pressure indicating position, as shown in FIGURE 4.

FIGURE 8 illustrates that the functions of pressure indication and automatic pressure relief can be separated, the arrangement of FIGURE 8 having no provision for automatic pressure relief. If desired, however, a pressure relief function can be added in FIGURE 8 by modifying the button 70 in the manner shown in FIGURE 9.

Thus, in FIGURE 9, the button will have the same general external dimensions as that of FIGURE 8, except that the button will be made of a dual wall structure including an inner wall structure 80 and an outer wall structure 81. Two or more slots 82 and 83 in the inner wall 80 then communicate with bleed passages 84 and 85, respectively, in the inner wall 80 which are sealed by the O-ring 73 when the stem 71 is moved to the left by an excessive pressure within the tire to which the valve is connected. This will then connect the bleed passages to the tire interior so that there will be automatic pressure relief until the valve stem 71 moves back to the right to again seal the bleed passages.

Although this invention has been described with respect to its preferred embodiments, it should be understood that many variations and modifications will now be obvious to those skilled in the art, and it is preferred therefore, that the scope of the invention be limited not by the specific disclosure herein, but only by the appended claims.

The embodiments of the invention in which an exclusive privilege or property is claimed are defined as follows:

1. A tire valve comprising a metallic tubular stem member; plug means having an interior cavity disposed within said metallic tubular stem member and axially movable between a sealing position and an open position within said metallic tubular stem member; first spring bias means associated with said plug means and biasing said plug means toward said sealing position; said plug means having a high pressure side facing the interior of said metallic tubular stem member and a low pressure side facing the exterior of said metallic tubular stem member; pressure relief means including a channel extending through the side of said plug means intermediate opposite ends of said cavity and the high and low pressure sides of the plug and providing communication between said interior cavity and the low pressure side of said plug means; a movable stem and piston sealingly and slidably disposed within the cavity in said plug means and movable between a sealing position between the channel and the high pressure side of said plug and an open position between the channel and the low pressure side of said plug; second spring bias means within the cavity in said plug means and biasing said movable stem toward its sealing position; said movable stem and piston having a high pressure side facing the interior of said metallic tubular stem member and a low pressure side facing the exterior of said metallic tubular stem member; said movable stem moving to its open position against the force of said second biasing spring when the pressure within said metallic tubular stem member exceeds a predetermined value to permit relief thereof through the channel providing communication between the cavity in the plug means and the low pressure side of said plug means.

2. The tire valve as set forth in claim 1 wherein said movable stem has an extension thereon extending to the exterior end of said tubular stem; said extension moving to an external visible position beyond the said end of said tubular stem responsive to pressures within said tubular stem which exceed a predetermined pressure.

3. A tubeless tire valve comprising an outer elongated elastomer body adapted for positioning in a rim hole; a metallic tubular stem member coaxially disposed in said elastomer body and having an end portion extending therefrom and adapted for interconnection with standard inflating and gauging equipment; said end portion having an inner cylindrical recessed portion therein facing outwardly therefrom, the side wall of said recessed stem end portion being of substantially reduced thickness; sealing means disposed within said recessed stem end portion; plug means provided with an interior cavity disposed within said metallic tubular stem member and axially movable within said stem member between a sealing position and an open position; said plug means having a high pressure side facing the interior of said metallic tubular stem member and a low pressure side facing the exterior of said metallic tubular stem member; spring means within said metallic tubular stem member for urging said plug means into sealing relationship with said sealing means; pressure relief means including a channel extending through the side of said plug means intermediate opposite ends of said cavity and the high and low pressure sides of the plug and providing communication between said interior cavity and the low pressure side of said plug means; a movable stem slidably disposed within the cavity in said plug means and extending therethrough, said movable stem having sealing engagement with the wall of the cavity in said plug means and being movable between a sealing position between the channel and the high pressure side of said plug and an open position between the channel and low pressure side of said plug; spring means within the cavity in said plug means and biasing said movable stem toward its sealing position with respect to said channel; said movable stem moving to its open position and providing relief through said channel when the pressure within said metallic tubular stem member exceeds a predetermined value.

4. A tire valve as set forth in claim 3 where the biasing spring within said plug means is produced from stainless steel having a constant-temperature characteristic to provide a biasing force wherein a predetermined combination of internal pressure and temperature is required to move said movable stem toward its open position with respect to the relief channel in said plug means.

References Cited

UNITED STATES PATENTS

| | | | |
|---|---|---|---|
| 1,311,898 | 8/1919 | Jackson | 137—226 |
| 2,606,570 | 8/1952 | Buenik | 137—226 |
| 3,006,364 | 10/1961 | Osborn | 137—538 |
| 3,153,423 | 10/1964 | Biello et al. | 137—493.6 X |
| 3,180,349 | 4/1965 | Steel et al. | 137—223 |
| 3,230,968 | 1/1966 | Struby | 137—227 |

OTHER REFERENCES

Machinery, February 1962, p. 160.

WILLIAM F. O'DEA, *Primary Examiner.*

D. H. LAMBERT, *Assistant Examiner.*

U.S. Cl. X.R.

137—493.6